A. E. SMITH.
AUTOMOBILE BUMPER.
APPLICATION FILED JAN. 11, 1918.
1,271,786.
Patented July 9, 1918.
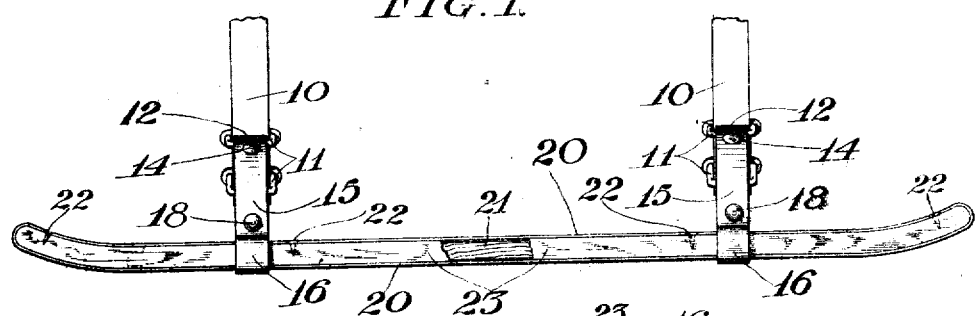
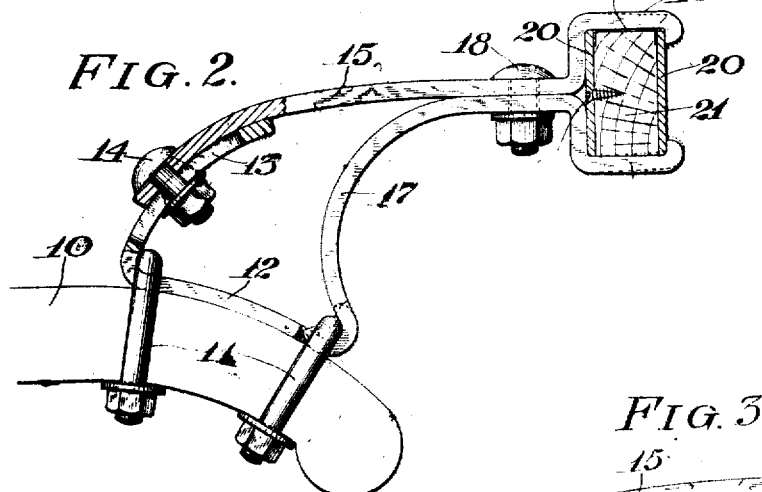
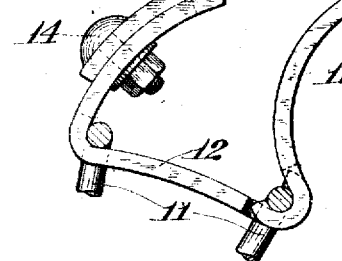
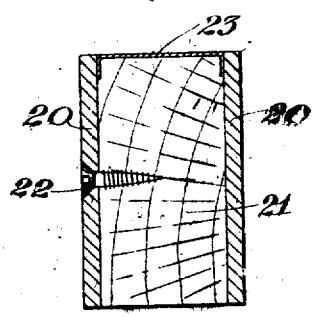
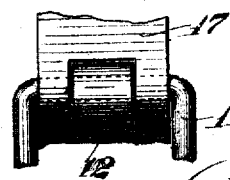
WITNESSES.
INVENTOR.
Albert E. Smith
By R. S. Caldwell
ATTORNEY.

UNITED STATES PATENT OFFICE.

ALBERT E. SMITH, OF MILWAUKEE, WISCONSIN, ASSIGNOR OF ONE-HALF TO BENJAMIN D. ZIMMERMAN, OF MILWAUKEE, WISCONSIN.

AUTOMOBILE-BUMPER.

1,271,786.  Specification of Letters Patent.  Patented July 9, 1918.

Application filed January 11, 1918. Serial No. 211,364.

*To all whom it may concern:*

Be it known that I, ALBERT E. SMITH, a citizen of the United States, and resident of Milwaukee, in the county of Milwaukee and State of Wisconsin, have invented new and useful Improvements in Automobile-Bumpers, of which the following is a description, reference being had to the accompanying drawings, which are a part of this specification.

This invention has for its object to provide an automobile bumper of the spring bar type in which the bumper bar is capable of yielding upon impact, and if bent out of shape may be readily restored to its original condition without great expense.

Another object of the invention is to provide such a spring bumper bar that will have a neat and ornamental appearance resembling that of a highly polished solid metal bar.

Another object of the invention is to provide such an automobile bumper with an adjustable yielding bracket for attaching it to the automobile frame, permitting angular adjustments to suit the shape of the frame, as well as clamping adjustments on the bar to suit the width of the frame, and thus adapt the bumper for attachment to automobiles built under different specifications.

With the above and other objects in view, the invention consists in the automobile bumper, its parts and combinations of parts as herein claimed and all equivalents.

Referring to the accompanying drawings, in which like characters of reference indicate the same parts in different views:

Figure 1 is a plan view of an automobile bumper constructed in accordance with this invention, a portion of the sheet metal covering being broken away to show the wood reinforcement;

Fig. 2 is a side view thereof with the bumper bar and a portion of the bracket sectioned;

Fig. 3 is a similar view of a modification thereof before the bracket is clamped on the bumper bar;

Fig. 4 is a sectional view of the bumper bar; and

Fig. 5 is a detail view of the hinge connection between the bracket members.

In these drawings 10 indicates the ends of the side bars of the automobile frame, which, as usual, are curved downwardly for connection with the springs. A pair of attaching brackets are secured thereto by means of U-bolts or ordinary axle clips 11. Each bracket comprises a member 12 which may be bent to conform to the curvature of the side bar 10 and which has its ends bent upwardly, the lower one to form a hook for engaging the U-bolt 11, and the upper one to form a hook for engaging the other U-bolt, and also to form an arc-shaped slotted portion 13 through which passes the clamping bolt 14 of a bracket member 15. The bracket member 15 has its rear end curved to conform with the curvature of the slotted portion 13 of bracket member 12, while its front end is bent to form a hook 16 for engagement with the bumper bar. A third bracket member 17 has its lower end forked and bent to form hooks for engagement with the lower U-bolt 11 on either side of the hook of the bracket member 12, which hook is reduced in width to permit of this relation of the parts as shown in Fig. 5. The hook engagements of the bracket members 12 and 17 form a hinge connection with the U-bolt 11 as the pivotal pin, and the arc of curvature of the slotted portion 13 of bracket member 12 and the rear end of bracket member 15 is concentric with such hinge connection. The bracket member 17 is bowed rearwardly above the hinge connection and is then clamped to the bracket member 15 by means of a clamping bolt 18, with its front end forming a hook 19 complementary to the hook 16 for clamping the bumper bar between them.

The bumper bar consists of an endless spring steel frame 20 bent to form a narrow bar and surrounding a wooden reinforcement 21, which may be of ash or other suitable wood having the requisite strength and resiliency. The wood reinforcement may be held within the spring frame 20 other than by the action of the clamping brackets, as by means of wood screws 22 passing through the spring frame 20 and into the wood reinforcement.

In order that the bumper bar may be given a polished metal surface at all of its parts exposed to view and thus add to its ornamental appearance, a thin sheet metal plate 23 covers the top surface of the wooden bar with its edges turned down and clamped between the wooden bar and the spring metal frame 20. The spring frame 20 and the top plate 23 may be nickelplated or otherwise uniformly finished to present the appearance of a solid bar. Or, if preferred, the top plate 23 may be omitted and a finish given to the wood corresponding with or in contrast to the finish given to the metal surrounding it.

The bumper construction of this invention is readily installed on any automobile, the base portion of the bracket member 12 of each bracket being bent more or less to correspond with the curvature of the front end of the side bar of the automobile frame and then clamped thereto by means of the U-bolts 11. The bumper bar may then be swung on the hinge connection formed between the bracket members 12 and 17, while the bolt 14 is loose and until the desired adjustment is obtained. The clamping bolts 14 are then tightened. The brackets may be adjusted on the bumper bar with the bolts 18 loose so as to vary the distance between them according to the distance between the sides of the frame 10 and then the bumper bar may be centered by sliding it through the brackets before the bolts are tightened. In tightening the clamping bolts 18 to draw the hooks 16 and 19 together for clamping the bumper bar between them, the hooks 16 and 19 are sprung slightly as indicated by the dotted lines in Fig. 2, so that they exert a spring clamping action on the bumper bar tending to hold it rigidly in place against longitudinal displacement, and the slightly beveled corners of the engaging surfaces of these hooks tend to press the parts of the bumper bar together as shown in Fig. 3, so that a firm clamping action is had thereon causing the metal spring and the wooden spring to reinforce each other.

A blow received by the bumper bar is cushioned and transmitted to the frame without injury thereto, for the bumper bar not only yields locally by bending at the point struck, but it yields as a whole on account of the flexible resilient brackets connecting it with the frame. The bowed bracket members may bend to yield to the force of the blow, and if permanently bent thereby may be reset with very little difficulty. Under a severe blow the clamping bolts 14 may yield and slide in the slotted portions 13 of the bracket members 12 without injury to the parts, giving a frictional resistance to the pivotally mounted bumper bar in addition to its resiliency and the resiliency of the bracket. The bar itself combines the spring action of the steel spring and the bow-shaped wooden spring, each reinforcing the other. It possesses a certain amount of resiliency which will permit it to yield to slight blows and resume its original form. A sharp bend which would render useless a bar of tubular construction or a channel iron bar, may break the wood reinforcement, but repairs may be made at a slight cost by straightening the spring metal frame 20 to its original shape and inserting a new wooden reinforcement.

The bumper of this invention is therefore less liable to injury because of the yielding nature of the bumper bar and its bracket supports, and when injured may readily be repaired at slight cost. It is much more ornamental in appearance because of the apparently solid structure of the bar and especially when provided with the top plate 23 enabling it to take a uniform metal polish in keeping with the other parts of the automobile.

I desire it to be understood that this invention is not limited to any specific form or arrangement of parts except in so far as such limitations are specified in the claims.

In the modification shown in Fig. 3 the bracket members 15 and 17 are connected by a loop 16' which may be contracted around the bumper bar by the tightening of bolt 18.

What I claim as new and desire to secure by Letters Patent is:

1. In an automobile bumper, a bumper bar consisting of a flexible resilient wooden member.

2. In an automobile bumper, a bumper bar comprising a wooden bar member mounted on yielding supporting brackets.

3. An automobile bumper, comprising a yieldable spring steel bumper bar with a wooden reinforcement.

4. An automobile bumper, comprising a yieldable wooden bumper bar with spring steel reinforcement.

5. An automobile bumper, comprising a bumper bar formed of spring steel around a wooden reinforcement, and yielding supporting brackets therefor.

6. An automobile bumper, comprising a bumper bar formed of spring steel around a wooden reinforcement with a metal covering for the wooden reinforcement.

7. An automobile bumper, comprising a bumper bar frame of spring steel around a wooden reinforcement with a metal plate covering the wooden reinforcement and having its edges turned down and clamped between the spring steel and the wooden reinforcement.

8. An automobile bumper, comprising yielding brackets each consisting of a bracket member adapted to be secured to the end of an automobile frame, a second bracket member pivotally connected therewith, and a third bracket member clamped to the second bracket member, the first bracket member and the third bracket member having their ends adjustably connected together, and a bumper bar clamped between the second bracket member and the third bracket member of each bracket.

9. In an automobile bumper, supporting brackets each comprising a fixed part adapted to be secured to the automobile frame and a swinging part having hinge connection with the fixed part, the fixed part and the swinging part having their ends adjustably connected together, and a bumper bar secured to the swinging part.

10. In an automobile bumper, a pair of brackets, each comprising a fixed part adapted to be secured to the automobile frame and a swinging part having hinge connection therewith, the swinging part having an end overlapping the end of the fixed part with a clamping bolt and slot adjustable connection between them, and a bumper bar clamped by the swinging part of each bracket.

11. An automobile bumper, comprising: supporting brackets, each consisting of; a fixed member fitting on the front end of the side bar of the automobile frame, a hook formed at one end of the fixed bracket member, an arc-shaped slotted portion bent up from the other end of the fixed bracket member, U-bolts fitting in the hook portion and the bent portion of the fixed bracket member for clamping it to the frame, a swinging bracket member having its end forked and engaging one of the U-bolts on opposite sides of the hook to form a hinge connection and having an arc-shaped end slidably fitting against the slotted portion of the fixed bracket member, and a clamping bolt for adjustably clamping said parts together; and a bumper bar carried by the brackets.

12. In an automobile bumper, a yielding supporting bracket comprising a portion fixed on the end of the automobile frame and upwardly and forwardly arched portions extending from the ends thereof, and a clamping member for clamping said arched portions together to clamp a bumper bar between them.

13. An automobile bumper, comprising yielding supporting brackets each consisting of a fixed bracket member with a hook formed at one end and an arc-shaped slotted extension bent up from the other end, U-bolts engaging the fixed bracket member at its hook portion and its bent-up portion for clamping it to the end of an automobile frame, an upwardly and forwardly arched bracket member forked and bent to form hooks engaging the U-bolt on opposite sides of the hook of the fixed bracket member and having a hook formed on its forwardly extending end, and a third bracket member clamped to the last mentioned bracket member and forming a complementary hook for engaging a bumper bar between them, said third bracket member being arched and fitting with the arc-shaped extension of the fixed bracket member and having a clamping bolt for engaging said extension through the slot thereof.

14. An automobile bumper, comprising a yielding supporting bracket consisting of arched forwardly extending bracket members connected together by a contractible loop for receiving and clamping a bumper bar, and means for contracting the loop.

15. In an automobile bumper, a supporting bracket comprising spring bracket members adjustably connected together at their rear ends and connected together at their front ends by means of a contractible loop for receiving and clamping a bumper bar, and a bolt connecting the bracket members near the loop for contracting the loop around the bumper bar.

In testimony whereof, I affix my signature, in presence of two witnesses.

ALBERT E. SMITH.

Witnesses:
R. S. CALDWELL,
H. D. CHASE.